Nov. 11, 1930.   A. N. CAMPBELL   1,780,970
HULL FOR WATER CRAFT
Filed Jan. 11, 1930   2 Sheets-Sheet 1

INVENTOR
A. Neil Campbell
per
R V Bowden
Attorney.

Nov. 11, 1930.   A. N. CAMPBELL   1,780,970
HULL FOR WATER CRAFT
Filed Jan. 11, 1930   2 Sheets-Sheet 2

INVENTOR
A. Neil Campbell
per R V Bowden
Attorney.

Patented Nov. 11, 1930

1,780,970

UNITED STATES PATENT OFFICE

ARCHIBALD NEIL CAMPBELL, OF LONDON, ENGLAND

HULL FOR WATER CRAFT

Application filed January 11, 1930, Serial No. 420,200, and in Great Britain October 24, 1928.

This invention relates to surface water craft of the kind having hollow keels, and has for its object to furnish such craft with cabin accommodation in which the requisite head room is provided in such manner as to avoid the need of any superstructure above the deck and natural gunwale of the hull.

According to the present invention the deck of the hull forms the roof of the cabin, the internal head room being provided by a relatively narrow hollow keel that communicates with the interior of the hull and is left uncovered between the cabin bulkheads so that the hollow keel forms a central fore and aft corridor through the cabin, in which latter sleeping berths, lockers and the like are arranged in the hull proper on each side of the hollow keel.

The hollow keel is of rectangular cross section amidships and is stream lined towards each end according to the design of the hull, and may either extend the full length of the hull or terminate at any required distance under or towards the stern quarter thereof.

The parts of the hollow keel which extend fore and aft of the cabin may be decked over and utilized in known manner for the accommodation of a motor engine and its driving gears and control, and also petrol and other fuel, stores, ballast or the like.

The present invention is illustrated by way of example in the accompanying drawings wherein similar references indicate like parts.

Figure 1:
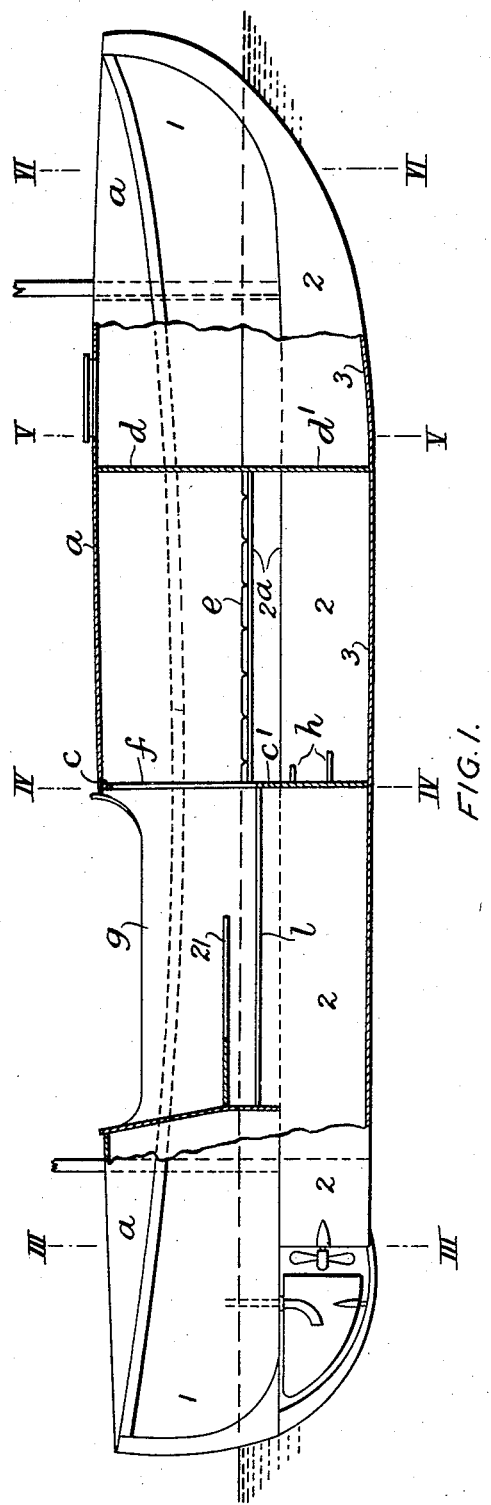
Figure 1 is a side view partly broken away and Figure 2 a plan in half section of a ten metre cabin cruiser provided with a motor engine and constructed in accordance with the present invention.
Figure 2:
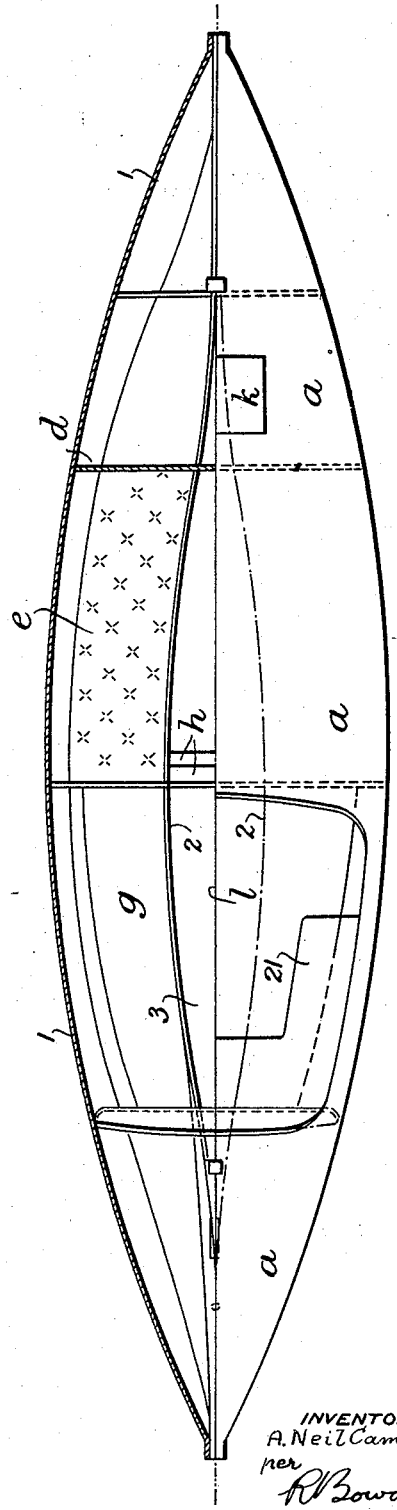
Figure 3:
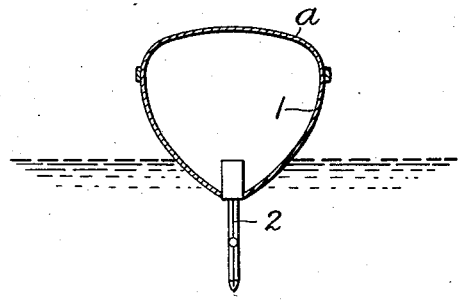
Figures 3 to 6 are cross-sections on the lines II—II, III—III, IV—IV, V—V and VI—VI (Figure 1).

As illustrated in the drawings the hull 1 is built upon the rectangular hollow keel 2 which serves to accommodate the motor, fuel and other heavy stores or gear, and is provided with a deck $a$ which in accordance with the present invention forms the roof of a cabin $b$ arranged forward of amiships between transverse bulkheads $c$ and $d$ that are continued into the hollow keel as indicated at $c'$ and $d'$ respectively.

The requisite head room within the cabin is provided by the hollow keel which is left uncovered between the cabin bulkheads so that the bottom 3 of the keel forms the floor of the cabin and provides a central corridor between bunks or sofas $e$ arranged in the hull at load-water level, the depth of the keel being sufficient to enable slabs of lead or other suitable ballast to be laid along the bottom thereof while leaving ample standing room within the cabin.

Figure 4:
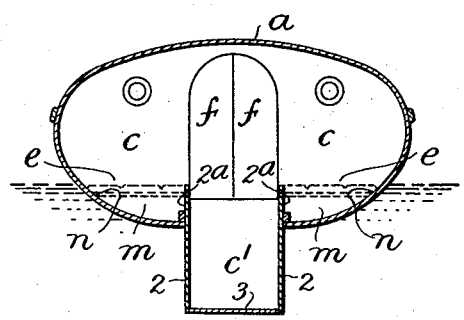
Figure 5:
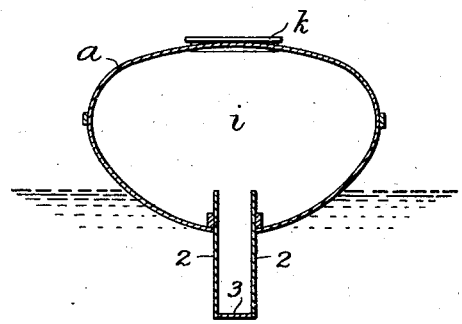
Figure 6:
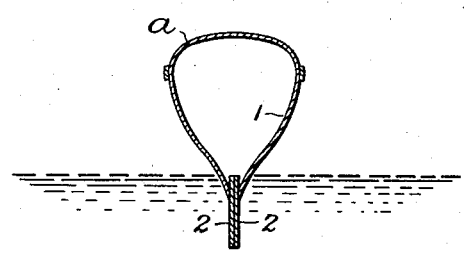

Lockers $m$ are arranged in any convenient manner beneath the bunks or sofas $e$ which latter may be hinged at $n$ (see Figure 4) to afford easy access to the lockers $m$, or the latter may be furnished with hinged falls or sliding doors, or with drawers or the like arranged in any convenient manner in the inboard sections $2^a$ of the hollow keel 2.

The aft bulkhead $c$ is provided with a door $f$ having the same width as the hollow keel 2, which door gives access to the cabin from the cockpit $g$, steps $h$ being arranged inside the cabin on the bottom part $c'$ of the bulkhead $c$ to facilitate entry into and exit from the cabin, while a compartment $i$ or continuation of the cabin forward of the bulkhead $d$ provides accommodation for a cooking galley, lavatory, etc.

The hatchway $k$ is arranged in the deck $a$ to give access to the forward compartment $i$, while if desired a narrow doorway may be arranged in the bulkhead $d$ to form a communication between the cabin $b$ and the forward compartment $i$.

The open cockpit $g$ is provided as usual with a seat 21 to accommodate the passengers and crew, while the motor engine, driving gear, petrol tanks and so forth are housed water-tight in compartments of the hollow keel 2 beneath the cockpit floor $l$, which latter is made readily removable to facilitate access to the hollow keel.

The absence of superstructure in cabin cruisers and like surface vessels constructed in accordance with the present invention eliminates top hamper and consequent wind pressure above the gunwale, the all-in centre of gravity of the vessel being consequently kept appreciably lower than in vessels of ordinary construction, while the requisite sail area can be carried by shorter and lighter masts with consequent lowering of the centre of wind effort, thus greatly enhancing the general seaworthiness of the vessel owing to its increased stability, safety and ease of handling under power or sail.

I claim:—

1. A surface water craft comprising a hull having a hollow keel wherein the deck of the hull forms the roof of the cabin in which internal head room is provided by the hollow keel which is left open between transverse bulkheads so as to form a central fore and aft corridor, on opposite sides of which corridor sleeping berths, lockers and the like are arranged in the hull proper, said bulkheads being provided with doors to give access to the cabin.

2. In a surface water craft comprising a hull having a hollow keel, the method of constructing a cabin in which the requisite head room is provided without superstructure above the deck and natural gunwale of the craft, by utilizing hollow keel to form a sunken fore and aft corridor between transverse bulkheads which run into the hollow keel and are provided with doors to give access to the cabin in which the sleeping berths and lockers are arranged in the hull on either side of the open hollow keel.

In testimony whereof I affix my signature.

ARCHIBALD NEIL CAMPBELL.